United States Patent [19]

Itaya

[11] Patent Number: 5,003,506
[45] Date of Patent: Mar. 26, 1991

[54] MEMORY CAPACITY DETECTION APPARATUS AND ELECTRONIC APPLIED MEASURING DEVICE EMPLOYING THE SAME

[75] Inventor: Hiroshi Itaya, Isehara, Japan

[73] Assignee: Anritsu Corporation, Tokyo, Japan

[21] Appl. No.: 200,762

[22] Filed: May 31, 1988

[30] Foreign Application Priority Data

Jun. 2, 1987 [JP] Japan ............... 62-137728

[51] Int. Cl.$^5$ ............................................. G06F 12/06
[52] U.S. Cl. .................................. 364/900; 364/970; 364/970.5; 371/21.1
[58] Field of Search .................. 364/200, 900; 365/230.03; 371/21.1

[56] References Cited

U.S. PATENT DOCUMENTS

4,592,011 5/1986 Mantellina et al. ................ 364/900
4,860,252 8/1989 Sykora ............................. 364/900

Primary Examiner—Michael R. Fleming
Assistant Examiner—Debra A. Chun
Attorney, Agent, or Firm—Frishauf, Holtz, Goodman & Woodward

[57] ABSTRACT

A RAM the capacity of which is to be detected is constituted by $2^N$ memory blocks each having a predetermined memory capacity. An address signal representing an existing memory capacity can be fed to the RAM. An address controller designates a predetermined address for each block of the RAM. A code write section sequentially writes a detection code at the predetermined address in each block of the RAM. A code readout section reads out the detection code from the predetermined address of the first block of the RAM designated by the address controller. A code comparator sequentially compares the detection code read out by the code readout section with a detection code last written by the code write section, so as to detect whether there is a coincidence therebetween, and, when a coincidence is obtained, the comparator is able to detect the capacity of the entire RAM based on the coincident detection code.

10 Claims, 6 Drawing Sheets

MEMORY CAPACITY DETECTION APPARATUS AND ELECTRONIC APPLIED MEASURING DEVICE EMPLOYING THE SAME

BACKGROUND OF THE INVENTION

1. Field of the Invention

This invention relates to an apparatus for detecting the capacity of a random access memory (RAM) such as a memory card and, more particularly, to a memory capacity detection apparatus wherein, in a RAM in which a memory space is constituted by $2^N$ blocks each having a predetermined capacity, a detection code is written at a specific address of the RAM, and an image of the detection code is generated so as to enable the memory capacity of the RAM to be determined.

The invention also relates to an electronic applied measuring device using the memory capacity detection apparatus described above and, more particularly, to an electronic applied measuring device which is capable of detecting the memory capacity of a memory for storing data which is necessary in measuring procedures and/or processes of the measuring equipment.

2. Description of the Related Art

In recent years, memory cards including programmable memories (RAMs) have come to be used in a variety of different fields, and are naturally used for electronic applied measuring devices. The specific application of such a memory card is determined by the card issuer, and hence, there is no need for detecting a storage capacity, i.e., a memory capacity of the memory card at the equipment side.

However, when memory cards are used in a variety of fields, use of a single memory card in all the systems is preferred. The memory capacity of a given memory card, as well as its cost, depends on the storage capacity of the memory chip embedded therein. Therefore, memory cards having different memory capacities are distributed. Therefore, an equipment must detect the memory capacity of a memory card to be used, especially for a read/write access. If the equipment cannot detect the memory capacity of a memory card to be used, important existing data may be broken or new data may not be stored safely.

When data having an address represented by a larger number of bits than that of an address corresponding to an existing memory space is present, data stored in lower blocks is rewritten by an image address.

The way in which an image address is generated will now be explained below.

In order to increase a memory capacity of a programmable RAM, some techniques are employed. One of these techniques is a technique wherein a memory space corresponding to a power of 2 is given as a fundamental unit ($2^J$ bytes, J is a positive integer), and a memory capacity is increased by a step ($2^{J+N}$) of $2^N$ (N=0, 1, 2, ...) times the fundamental unit. For example, when a memory having a larger memory capacity than a memory whose fundamental unit corresponds to $2^{13}$ bytes (J=13) is to be provided, a memory capacity is increased like $2^{13+1}$ bytes (N=1), $2^{13+2}$ bytes (N=2), ...

Virtual blocks are set in all the memory spaces of a RAM having a fundamental unit of $2^J$ bytes and a total capacity of $2^{J+N}$ bytes as shown in the Table below.

| Virtual Block | Range of Address Lower Address | Range of Address Upper Address | Number of Bits of Address | Memory Space |
|---|---|---|---|---|
| First Block | $2^0$ | $2^J$ | J | Fundamental unit ($2^J$) |
| Second Block | $2^J + 1$ | $2^{(J+1)}$ | J + 1 | $2^0$ times of Fundamental unit |
| Third Block | $2^{(J+1)} + 1$ | $2^{(J+2)}$ | J + 2 | $2^1$ times of Fundamental unit |
| (N + 1)th Block | $2^{(J+N-1)} + 1$ | $2^{(J+N)}$ | J + N | $2^{(N-1)}$ times of Fundamental unit |

When an address is expressed in binary notation, the number of bits of an address is increased by one bit toward upper blocks such that an address corresponding to the memory space of a first block is J bits, an address corresponding to the memory space of a second block is (J+1) bits, and so on, as shown in the Table above. Considering an address from the least significant bit to a Kth bit (bits equal to and larger than a (J+1)th bit are ignored, an address equal to that address is present in all the blocks.

When an address larger than an address corresponding to an existing memory space ($2^{(J+1)}$ bytes), e.g., a nonexisting address ((J+N+Y) bits) such as $2^{(J+N+Y)}$ (Y≧1), is designated, the upper Y bits of the address are ignored, and an address which is equal to the value of lower bits (J+N), and which corresponds to a memory present in a lower block, is read out. The actually readout address (which differs from the designated address) is called an image address of the designated address.

The present invention aims at detecting a memory capacity by utilizing the feature of generation of an image address, which causes a problem upon use of a RAM.

SUMMARY OF THE INVENTION

It is therefore an object of the present invention to provide a new and improved memory capacity detection apparatus in which the capacity of a RAM can be automatically detected whereby a detection code serving as an address for detecting a memory capacity is written in a RAM which can be divided into blocks having virtual boundaries at every position corresponding to $2^N$ times a predetermined memory capacity used as a fundamental unit, and the presence/absence of image generation is discriminated at the detection address.

It is another object of the present invention to provide an electronic applied measuring equipment which uses the memory capacity detection apparatus described above, and which can arbitrarily rewrite data which is necessary in procedures and/or processes of measurement.

According to an aspect of the present invention, there is provided a memory capacity detection apparatus for detecting the capacity of one of a plurality of RAMs each of which is constituted by $2^N$ blocks each having a predetermined memory capacity, and to which is fed an address signal representing an existing memory capacity, the apparatus comprising:

address control means for designating a predetermined address in each block of the RAM;

code write means for sequentially writing a detection code at the predetermined address in each block of the RAM;

code readout means for reading out the detection code from the predetermined address of a first block of the RAM designated by the address control means; and code comparison means for sequentially comparing the detection code read out by the code readout means and the detection code written by the code write means, so as to detect a coincidence therebetween, thereby detecting the capacity of the RAM.

According to another aspect of the present invention, there is provided an electronic applied measuring device comprising:

a measuring device body; and

RAM capacity detecting means for detecting the capacity of a RAM storing data required for measurement procedures and/or processes, by the measuring device body, the RAM being one of a plurality of RAMs each of which is constituted by $2^N$ blocks each having a predetermined memory capacity, and to which an address signal representing an existing memory capacity is fed, and wherein the RAM capacity detecting means comprises:

address control means for designating a predetermined address in each block of the RAM;

code write means for sequentially writing a detection code at the predetermined address in each block of the RAM;

code readout means for reading out the detection code from the predetermined address of a first block of the RAM designated by the address control means; and code comparison means for sequentially comparing the detection code read out by the code readout means and the detection code written by the code write means, so as to detect a coincidence therebetween, thereby detecting the capacity of the RAM.

BRIEF DESCRIPTION OF THE DRAWINGS

These and other objects and features of the present invention will be understood through the following embodiments, with reference to the accompanying drawings, in which.

DETAILED DESCRIPTION OF THE PREFERRED EMBODIMENTS

The schematic arrangement of a memory capacity detection apparatus according to the present invention will now be described hereinafter.

The memory capacity detection apparatus of the present invention detects the memory capacity of a memory card the memory capacity of which is constituted in units of blocks. The memory capacity detection apparatus comprises an address controller for generating a specific address predetermined for each block in the order of the blocks, and for generating the specific address for a first block each time the specific address for the second and subsequent blocks is generated, a code write section for writing a detection code at the specific address of each block, a code readout section for, when the code write section has written the detection code at the specific address of each block, accessing the first block by using the specific address output from the address controller, so as to read out the detection code stored at the specific address, a code comparator for comparing the detection code stored at the specific address of each block by the code write section with the detection code read out from the first block by the code readout section, and a code address controller for, when the code comparator detects a non-coincidence between the two detection codes, generating a control signal for causing the address controller to generate the specific address for accessing the next block, causing the code write section to output and write the detection code, and then causing the code readout section to read out the detection code stored at the specific address in the first block. Thus, apparatus detects the memory capacity of the memory card on the basis of the image generation/non-generation of the detection code.

Preferred embodiments of the present invention will now be described hereinafter, with reference to the accompanying drawings.

First Embodiment

Figure 1:
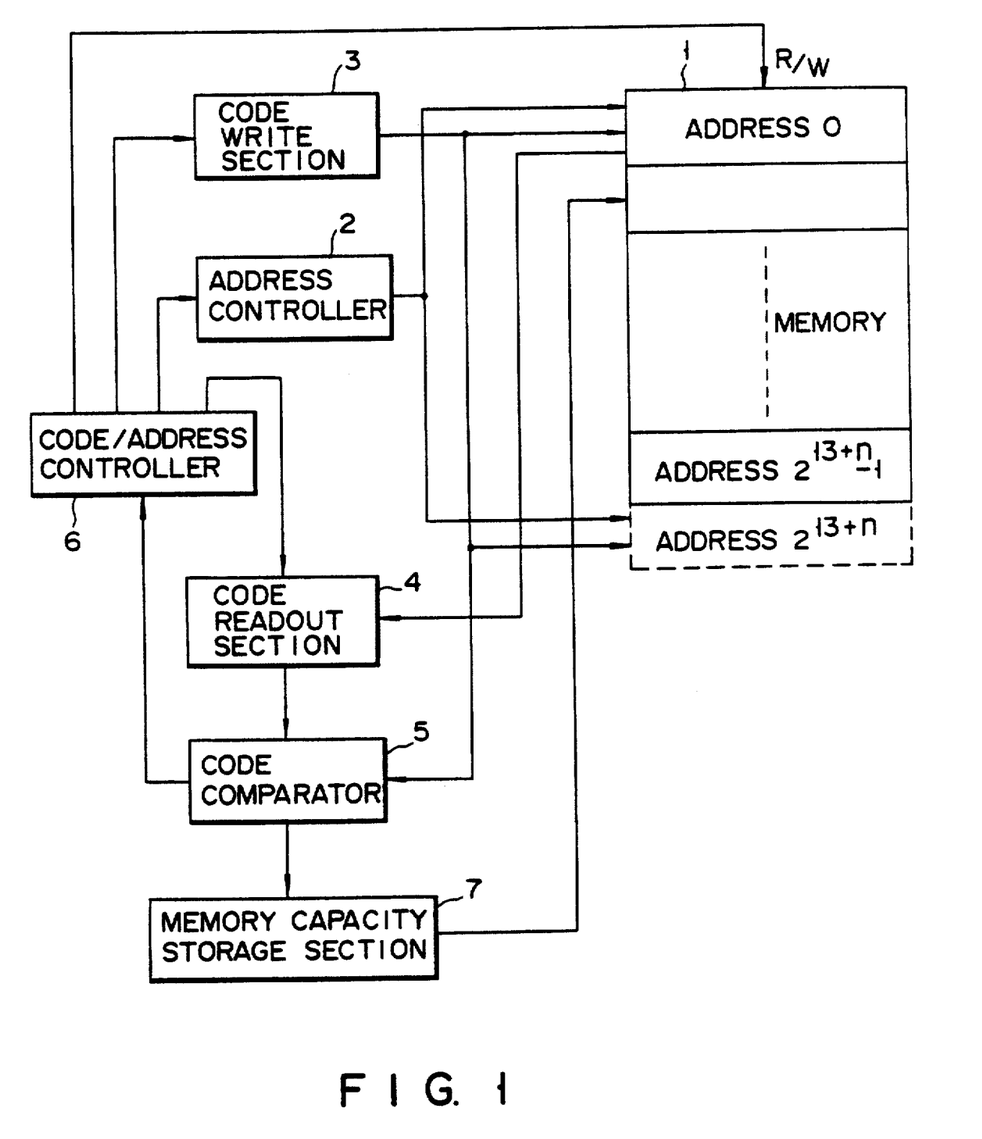
FIG. 1 is a block diagram showing an embodiment of a memory capacity detection apparatus for use with a memory card, according to the present invention.
Figure 2:
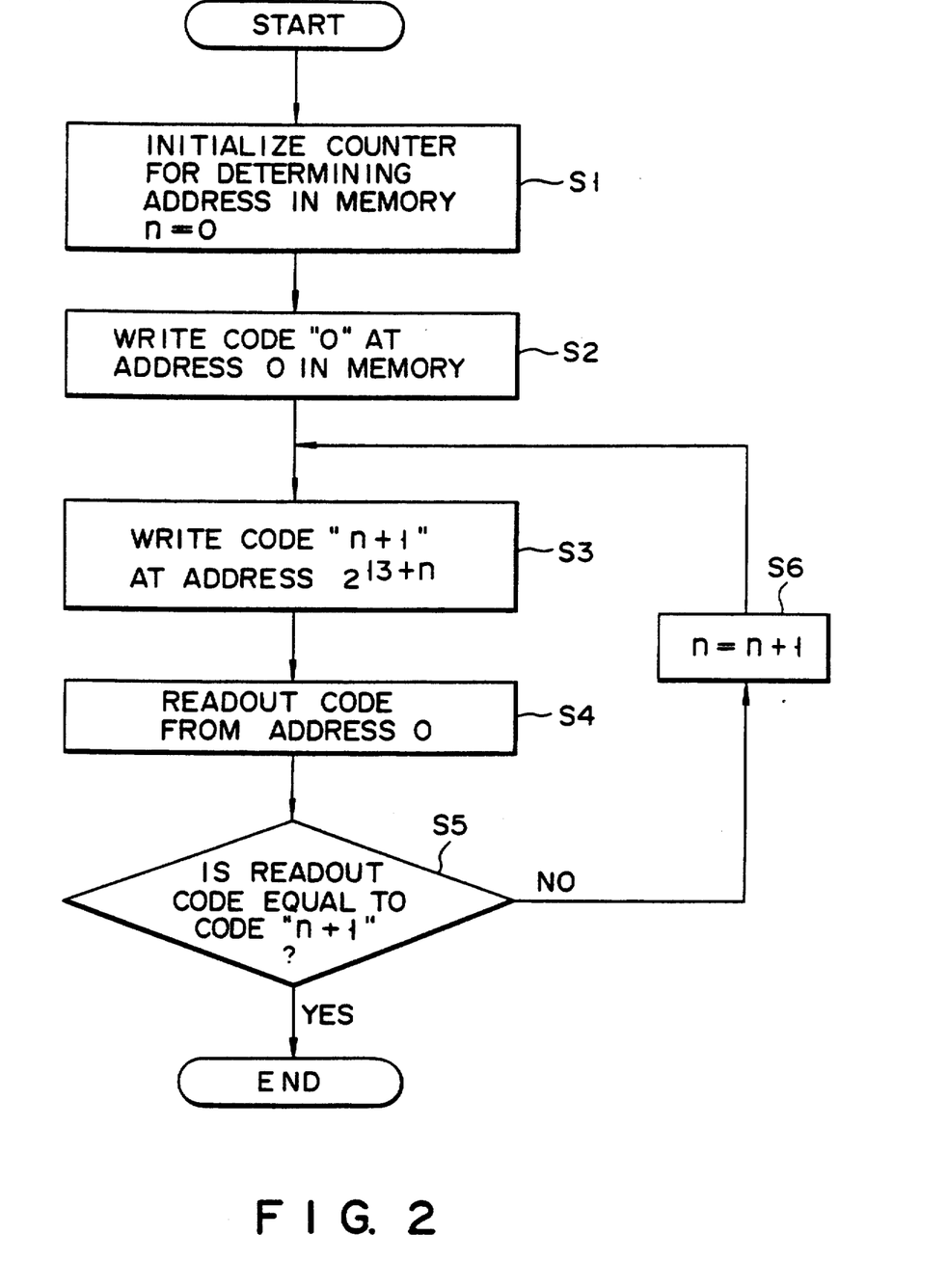
FIG. 2 is a flow chart for explaining the operation of the apparatus shown in FIG. 1.
Figure 3:
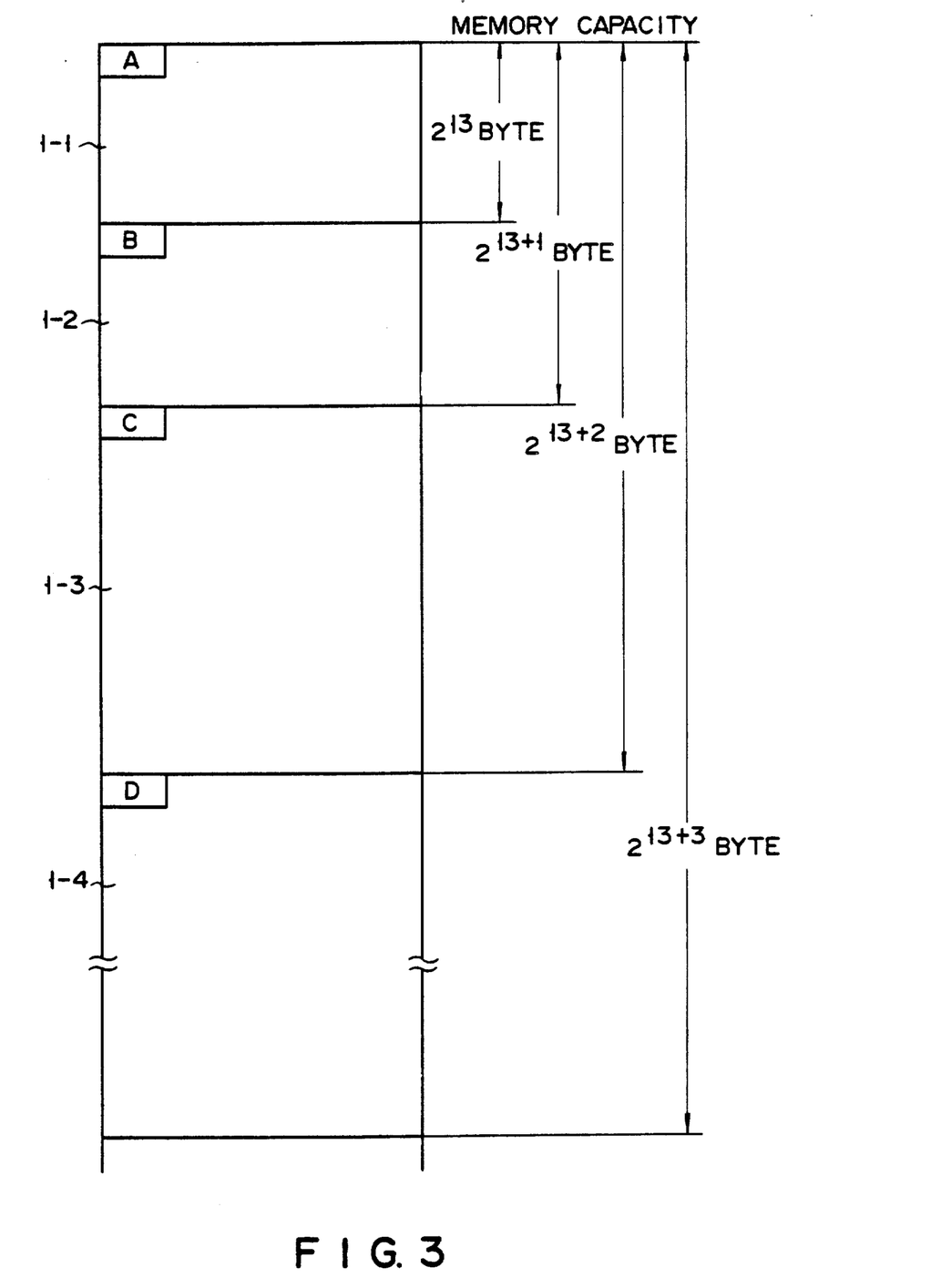
FIG. 3 is a view for explaining a method of detecting a memory capacity.
Figure 4A:
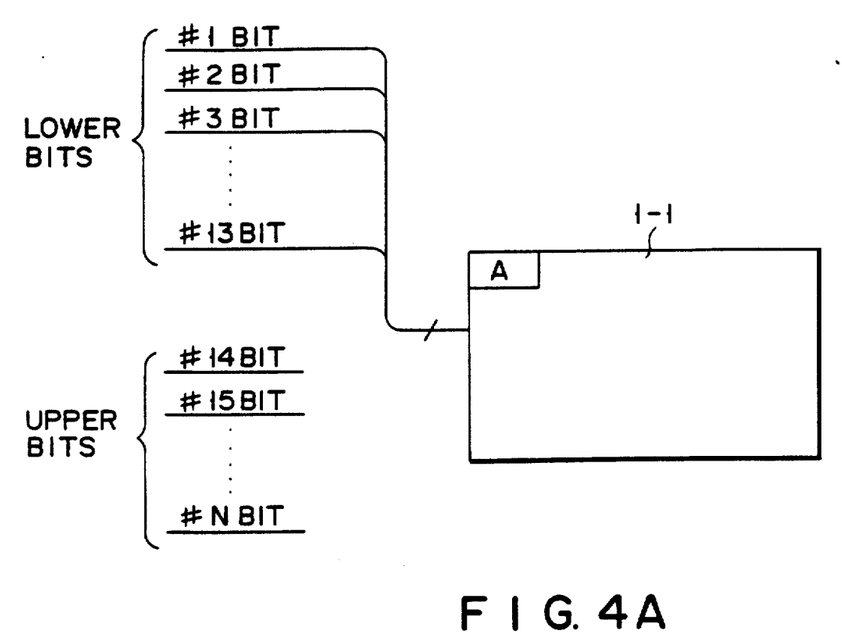
FIGS. 4A and 4B are views for explaining connection states of address lines.
Figure 4B:
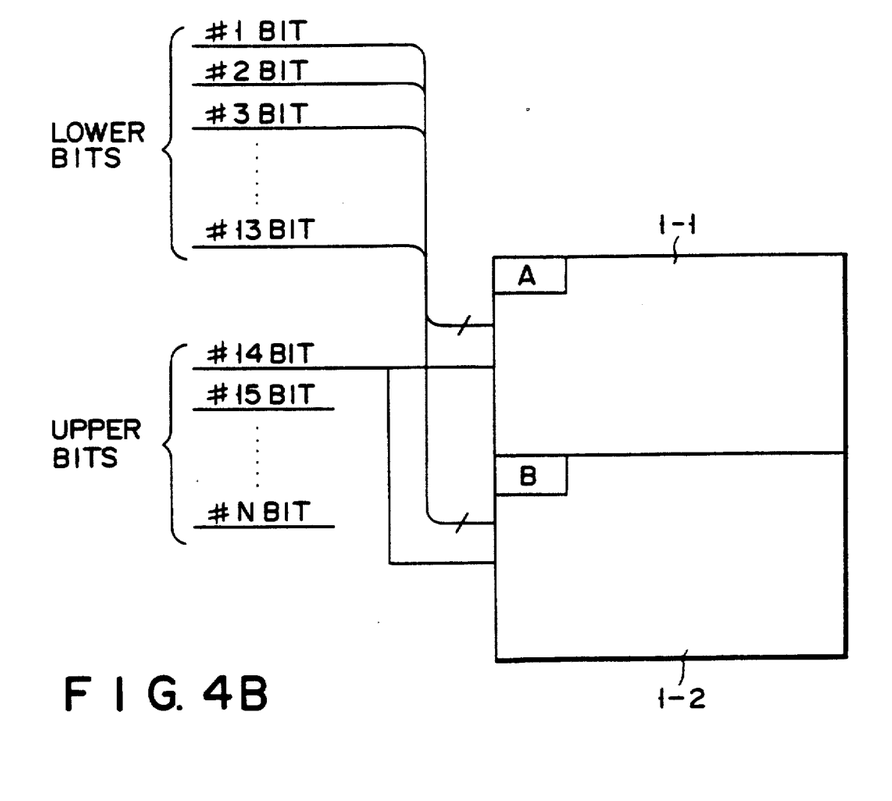

FIG. 1 is a block diagram showing an apparatus for detecting the memory capacity of a RAM, according to an embodiment of the present invention; FIG. 2 is a flow chart for explaining the operation of the apparatus shown in FIG. 1; FIG. 3 is a view for explaining a method of detecting a memory capacity; and FIGS. 4A and 4B are views for explaining connection states of address lines. An embodiment of the present invention will now be described below, as used in conjunction with a memory card incorporating a RAM.

Figure 5:
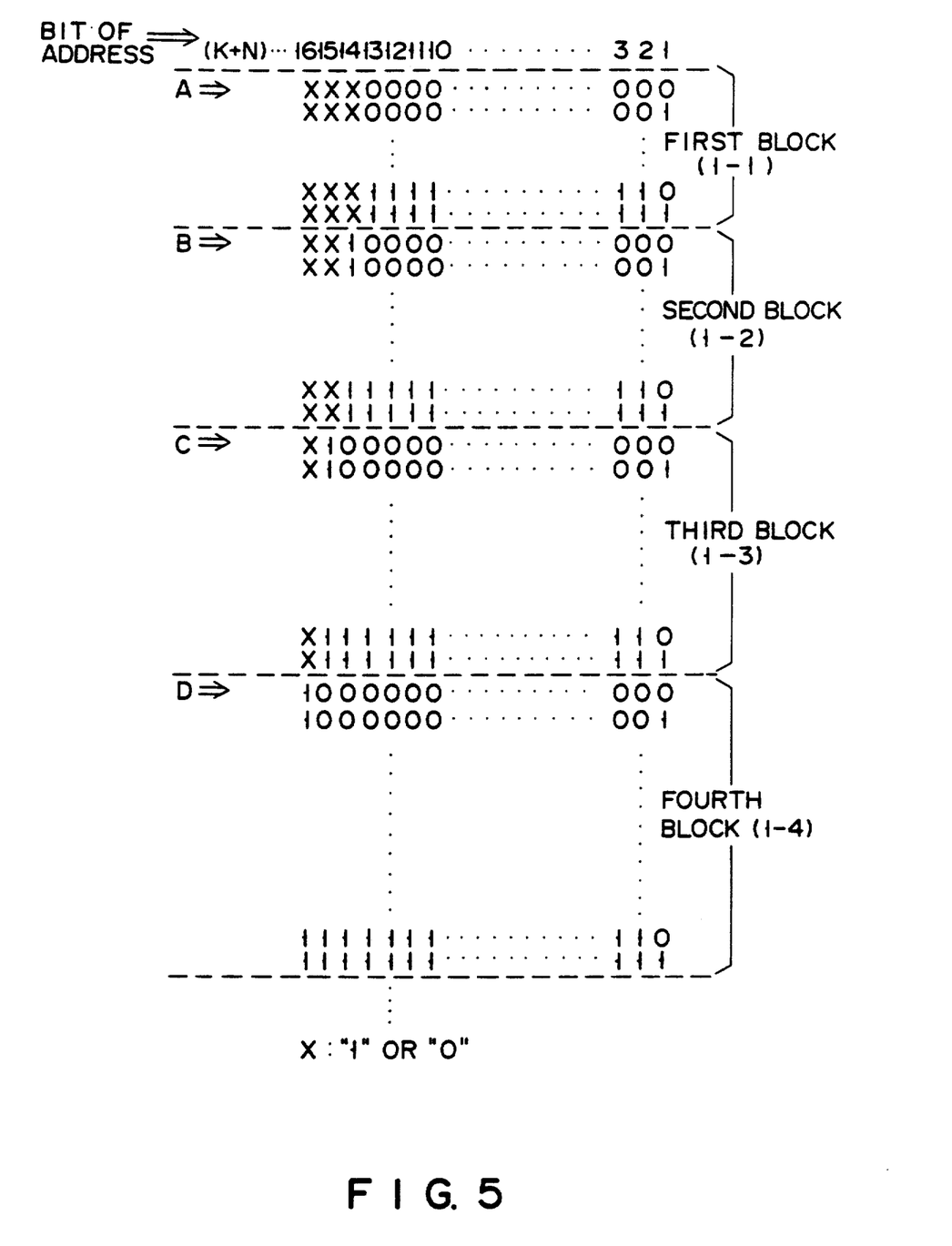
FIG. 5 is a view for explaining a state of addresses.

Referring to FIG. 3, reference numerals 1-1, 1-2, 1-3, and 1-4 represent blocks having boundaries at every $2(J+N)$ bytes in the memory space of a RAM. A RAM having block 1-1, one having blocks 1-1 and 1-2, one having blocks 1-1 to 1-3, and one having blocks 1-1 to 1-4 are prepared so as to manufacture memory cards having various different storage capacities, i.e., memory capacities. Specific addresses of these blocks, e.g., the start addresses of the blocks are used as detection addresses A, B, C, and D. If the minimum storage capacity of a memory is $2^{13}$ bytes, in addresses A to D, common address portions, i.e., lower 13 bits are represented by all "0"s, and their upper bits designate start addresses A to D of blocks 1-1 to 1-4 (FIG. 5).

A given detection code "1" is written at detection address A (1st to 13th bits are all "0"s) of first block 1-1. After detection address B (1st to 14th bits are all "0"s)

of second block 1-2 is designated and a given detection code "2", different from the detection code "1", is output, the detection code stored at address A of first block 1-1 is read out. If the detection code read out from address A of first block 1-1 coincides with the detection code "2" to be written at address B of second block 1-2, the memory capacity of the RAM is $2^{13}$ bytes, as shown in FIG. 3. More specifically, since this RAM has no second block 1-2, an image address (a 14th bit is ignored, and 1st to 13th bits are all "0"s) is generated, and the detection code "2" is written not at address B of second block 1-2 but at address A of first block 1-1 in practice. This is because the lower 13 bits have a common address of all "0"s, and the upper bits can be either "0" or "1". More specifically, as shown in FIG. 4A, address lines corresponding to lower 1st to 13th bits are connected to first block 1-1 representing a minimum storage capacity of $2^{13}$ bytes of a memory. However, address lines corresponding to a 14th bit or higher of the upper bits are not connected to first block 1-1. Therefore, if the detection code "2" is written using the lower 13 bits and the 14th bit, the address is determined by the address lines of lower 13 bits, in practice, and the detection code "2" is written at address A of first block 1-1.

If the detection code read out from address A of first block 1-1 is "1" and is different from the detection code "2" sent to address B of second block 1-2, this suggests that the memory capacity is $2^{13+1}$ bytes or more. More specifically, as shown in FIG. 4B, second block 1-2 is present, and address lines of 1st to 13th bits of the lower 13 bits and the 14th bit of the upper bit are connected to second block 1-2. Therefore, when the detection code "2" is written using the lower 13 bits and the 14th bit of the upper bits, the detection code "2" is written at address B of second block 1-2, and is not written at address A of block 1-1. Thus, the detection code "1" is read out from address A of block 1-1.

Similarly, different detection codes are written at addresses C and D of blocks 1-3 and 1-4, and the written codes are compared with the detection code stored at address A of block 1-1, thereby detecting the memory capacity of the memory card. More specifically, when detection addresses B, C, and D of blocks 1-2 to 1-4 are designated, it is detected if the detection code is written at address A of block 1-1 by generation of an image address, thus detecting the memory capacity of the RAM.

In an arrangement of a memory capacity detection apparatus of a memory card according to an embodiment of the present invention shown in FIG. 1, reference numeral 1 denotes a memory prepared in a RAM whose memory capacity is to be detected; 2, an address controller; 3, a code write section; 4, a code readout section; 5, a code comparator; 6, a code/address controller; and 7, a memory capacity storage section.

Memory 1 is a RAM having a memory space of a minimum storage capacity of, e.g., $2^{13}$ bytes. When memory (RAM) 1 is a memory card, it has a memory capacity of $2^{J+N}$ bytes (J is a positive integer, and N=0, 1, 2, ...) such as $2^{13}$ bytes, $2^{13+1}$ bytes, $2^{13+2}$ bytes, .. . Memory 1 is constituted by blocks, as shown in FIG. 3. A $2^{13}$-byte memory card comprises block 1-1 shown in FIG. 3, a $2^{13+1}$-byte memory card comprises blocks 1-1 and 1-2 shown in FIG. 3, a $2^{13+2}$-byte memory card comprises blocks 1-1 to 1-3 shown in FIG. 3, and a $2^{13+3}$-byte memory card comprises blocks 1-1 to 1-4 shown in FIG. 3.

Address controller 2 includes an address counter, and causes it to sequentially generate start addresses A to D of blocks 1-1 to 1-4 shown in FIG. 3 in the order of blocks 1-1 to 1-4. Each time the address counter generates start addresses B to D of second to fourth blocks 1-2 to 1-4, controller 2 causes it to generate start address A of block 1-1.

Code write section 3 outputs a predetermined detection code corresponding to each block at the start address in a block of memory 1, which is designated by address controller 2, and writes the code at the address.

After code write section 3 writes the predetermined detection code at the address output from the address controller 2, code readout section 4 accesses block 1-1 of memory 1, and reads out the detection code stored at start address A of block 1-1.

Code comparator 5 compares the detection code for an upper block generated by code write section 3 with the detection code read out from block 1-1 in memory 1 by code readout section 4 to check a coincidence therebetween.

When code/address controller 6 receives a noncoincidence signal from code comparator 5, or during initialization, controller 6 causes address controller 2 to sequentially generate start addresses A to D of blocks 1-1 to 1-4 in memory 1. Controller 6 causes code write section 3 to output the detection code and to write it at the predetermined address in memory 1 designated by address controller 2.

When memory capacity storage section 7 receives a coincidence signal from code comparator 5, it writes a code of the detected memory capacity at a predetermined address of memory 1.

The operation of the apparatus shown in FIG. 1 will be described hereinafter with reference to the flow chart shown in FIG. 2.

Code/address controller 6 sends an initial signal to address controller 2 and code write section 3. Thus, address controller 2 initializes its address counter, and outputs start address A of first block 1-1 (step S1). Code write section 3 outputs a predetermined detection code, e.g., "0", and writes the detection code "0" at start address A of first block 1-1 output from address controller 2 (step S2). Code/address controller 6 outputs a control signal to address controller 2 and code write section 3. Address controller 2 outputs an address indicating start address B of second block 1-2, i.e., address $2^{13}$. Code write section 3 outputs a detection code different from the detection code "0", e.g., "1", and writes the detection code "1" at address $2^{13}$ output from address controller 2 (step S3). In this case, the detection code "1" is input to code comparator 5, and is held therein. Code/address controller 6 outputs a control signal to address controller 2 and code readout section 4, and address controller 2 outputs start address A of first block 1-1, i.e., address 0. Code readout section 4 reads out the detection code stored at start address A of first block 1-1 using address 0 (step S4). The readout detection code is input to code comparator 5. Code comparator 5 compares the previously input detection code "1" with the detection code read out from start address A of first block 1-1 by code readout section 5 (step S5). If a noncoincidence is found therebetween, i.e., if the first stored detection code "0" is read out from start address A of block 1-1, code comparator 5 outputs a noncoincidence signal to code/address controller 6. Upon reception of the noncoincidence signal, code/address controller 6 outputs a control signal to address controller 2 and code write section 3. Address controller 2 outputs an address indicating start address C of third block 1-3, i.e., address $2^{13+1}$ (step S6). Code write section 3 outputs a detection code different from the detection code "0", e.g., "2", and writes the detection code "2" at address $2^{13+1}$ output from address controller 2 (step S3). In this case, the detection code "2" is input to code comparator 5, and is held therein. Subsequently, code/address controller 6 outputs a control signal to address controller 2 and code readout section 4. Address controller 2 outputs start address A of first block 1-1, i.e., address 0. Code readout section 4 reads out the detection code stored at start address A of first block 1-1 using address 0 (step S4). The readout detection code is input to code comparator 5. Code comparator 5 compares the previously input detection code "2" with the detection code read out from start address A of first block 1-1 by code readout section 4 (step S5). If a noncoincidence is found therebetween, i.e., if the first stored detection code "0" is read out from start address A of block 1-1, code comparator 5 outputs a noncoincidence signal to code/address controller 6. Thereafter, the above steps are repeated.

When code comparator 5 detects that the detection code "1" or "2" to be written at start address B of second block 1-2 or start address C of third block 1-3 coincides with the detection code read out from start address A of first block 1-1 (step S5), this indicates that second or third block 1-2 or 1-3 is not present, and the detection code is apparently written at start address B of block 1-2 or start address C of block 1-3. In practice, however, the detection code is written at start address A of block 1-1 by an image address. Therefore, when a coincidence with the detection code "1" is detected, it is detected that block 1-2 and the subsequent blocks of memory 1 are not present, only block 1-1 is present, and the memory capacity of the memory card is $2^{13}$ bytes of block 1-1. Memory capacity storage section 7 generates a code corresponding to $2^{13}$ bytes, and writes the generated code at a predetermined address of block 1-1. When a coincidence with the detection code "2" is detected, it can be detected that blocks 1-3 and 1-4 of memory 1 are not present, blocks 1-1 and 1-2 are provided, and the memory capacity of the memory card is $2^{13+1}$ bytes. A code corresponding to $2^{13+1}$ bytes is written at a predetermined address in block 1-1 or 1-2 by memory capacity storage section 7. Similarly, $2^{13+n}$ when the detection code "0" stored at start address A of block 1-1 is rewritten upon generation of an image address corresponds to the memory capacity of the memory card.

In this manner, when an address at which the memory capacity of the memory card is stored is referred, the remaining memory capacity can be detected from the currently used memory capacity. Thus, important data can be prevented from a storage error.

More specifically, the memory capacity of the memory card can be detected, and a code corresponding to the detected capacity can be stored at an identification address (the detection address or another specific address) in a memory. Normally, the memory capacity of a brand-new RAM is detected by the memory capacity detection apparatus of the present invention before it is used in a practical application, and the detected capacity is stored at an identification address in the memory (formatting).

Desired data is stored in the formatted memory card excluding the identification address portion. Thus, data corresponding to the total capacity of the memory card can be stored at the identification address.

A means for detecting an uppermost address at which data is stored can be provided. With this means, a difference is calculated based on the uppermost address and the data representing the total memory capacity stored at the identification address, thereby detecting a remaining blank memory capacity (remaining capacity). Thus, important data can be protected from a storage error.

In the above embodiment, a start address of each block is designated as a detection address. However, the present invention is not limited to this, and an arbitrary address ($Z \leq 2^J$) may be designated as long as it is included in a first block. In this case, a detection address in upper blocks is ($Z+2^{(J+N)}$).

In the above description, the minimum storage capacity of the memory is $2^{13}$ bytes. However, the minimum storage capacity of the memory can be arbitrarily selected.

The number of blocks shown in FIG. 3 is not limited to four blocks 1-1 to 1-4 but may vary in accordance with a memory capacity of a memory card.

(Second Embodiment)

Figure 6:
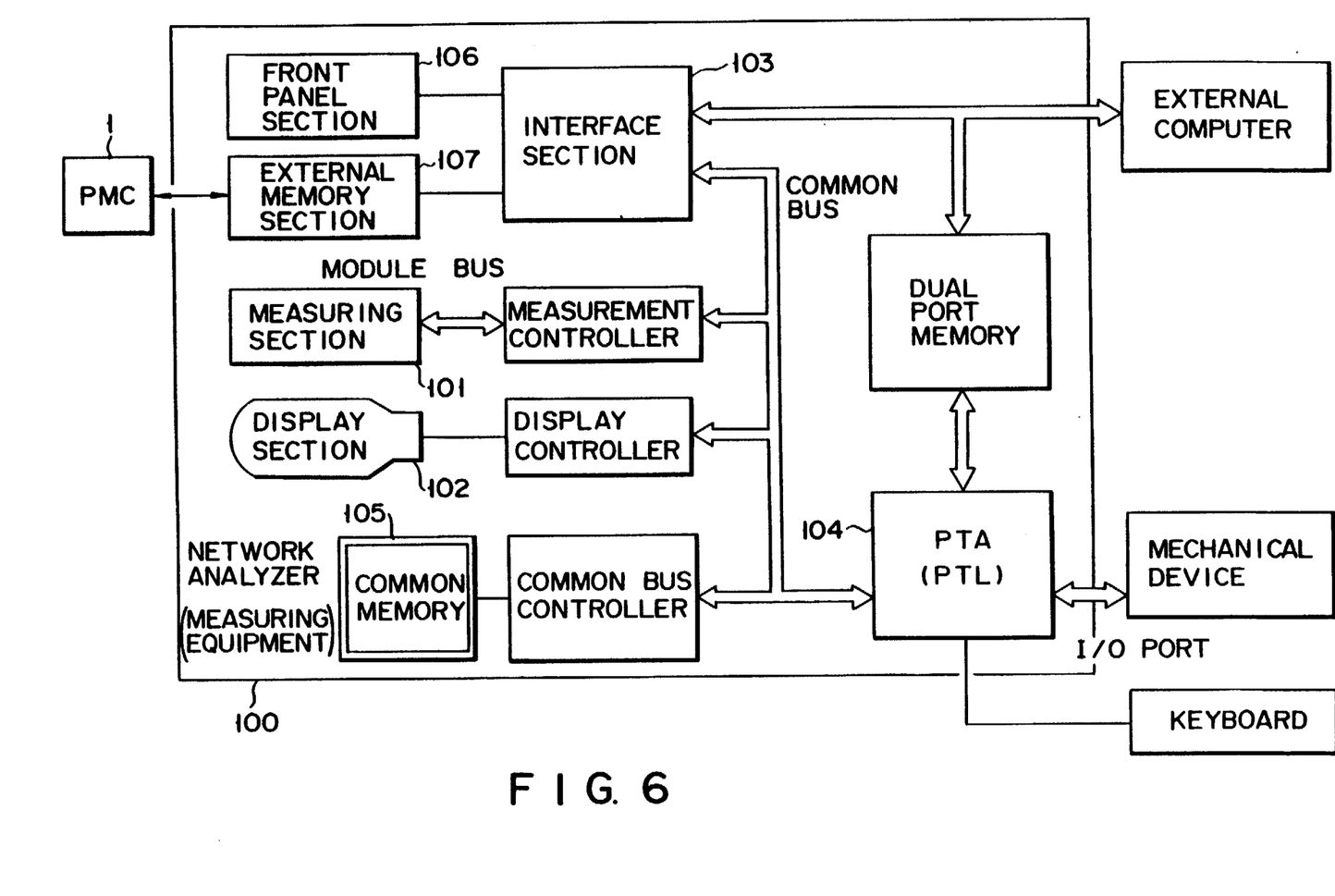
FIG. 6 is a block diagram showing an embodiment of an electronic applied measuring device according to the present invention.

FIG. 6 shows an arrangement of a network analyzer according to a second embodiment as an electronic applied measuring equipment using the memory capacity detection apparatus according to the first embodiment.

In FIG. 6, modules (measuring section 101, display section 102, interface section 103, and PTA (personal test automation) section 104) of network analyzer 100 are connected through a common bus using common memory 105 as a medium. For this reason, PTA section 104 is directly connected to each module through the common bus, and an optimal measuring sequence can be directly controlled. Thus, a high-speed ATE (automatic test equipment) can be easily realized. Measuring section 101 of a module structure employs memory card 1 comprising the RAM, called a PMC (Plug-in Memory Card), as external memory section 107 which is used for setting a program file of PTA section 104, setting front panel 106 and storing various data.

Memory card (PMC) 1 comprising the RAM stores program data of measurement procedures necessary for network analyzer 100 and/or data required during a measuring process. The storage content can be desirably written by a user.

As described above, according to the present invention, a memory capacity of a RAM (memory card) can be automatically detected. Even if RAMs (memory cards) having different memory capacities are used, since the memory capacities of the memory cards can be detected in advance, the memory capacities can be managed. Thus, data can be prevented from being broken by image addressing or data can be prevented from a storage error due to overflow of the memory.

What is claimed is:

1. A memory capacity detection apparatus for detecting a memory capacity of an arbitrary one of a plurality of RAMs each having a memory capacity corresponding to any one of a number (1, 2, 4, 8, ...) of memory blocks, wherein the entire memory capacity of each RAM is ($2^{J+N}$) bytes wherein J is a positive integer, and N=0, 1, 2, ..., according to the number of memory blocks in each RAM, said apparatus comprising:

address control means for sequentially generating specified addresses to blocks of a selected RAM, said specified address being common for said blocks with respect to bits from a least significant bit to a J-th bit;

code write means for sequentially generating detection codes capable of sequentially identifying each of the blocks of the selected RAM, and for writing each of the detection codes to the specified address generated by said address control means, wherein a detection code corresponding to a non-existing block for said RAM is written at the specified address of a first block of the RAM by generation of an image address, to replace a previously written detection code identifying the first block;

code readout means for reading out the detection code written in the first block of said RAM every time said code write means write a detection code to additional blocks of the RAM other than said first block;

code comparison means for sequentially comparing the detection code read out by said code readout means and the detection codes written to the additional blocks of said RAM by said code write means; and memory capacity detection means including determining means for determining that a detection code read out by said code readout means has been written by generation of said image address to said first block instead of the non-existing block, when a comparison result produced by said code comparison means represents a coincidence, and detecting means for detecting that said RAM has a memory capacity of a number of blocks corresponding to that detection code generated prior to the coincident detection code determined by said determining means.

2. An apparatus according to claim 1, wherein each of said plurality of RAMs is in the form of a memory card.

3. An apparatus according to claim 1, wherein said specified addresses correspond to initial addresses of each block of said RAMs.

4. An apparatus according to claim 1, further comprising code/address control means including a counter for causing said address control means and said code write means to be sequentially operated after said counter is initialized, and when comparison results produced by said code comparison means represent non-coincidence.

5. An apparatus according to claim 1, further comprising memory capacity storage means for writing a code representing a memory capacity of the selected RAM as detected by said memory capacity detecting means.

6. Electronic applied measuring equipment arranged to use an external RAM having a memory capacity corresponding to any one of a number (1, 2, 4, 8, ...) of memory blocks, wherein the entire memory capacity of each RAM is $(2^{J+N})$ bytes wherein J is a positive integer, and N=0, 1, 2, ..., according to the number of memory blocks in each RAM, said equipment comprising:

measuring means for measuring an electrical characteristic;

control means coupled to said measuring means, for controlling said measuring means in a predetermined measuring sequence;

external memory means coupled to said control means and to said external RAM, for storing program data for said control means and various data for said measuring means in said external RAM by operation of said control means; and RAM capacity detection means which includes:

(a) address control means for sequentially generating specified addresses to blocks of an external RAM, said specified addresses being common for said blocks with respect to bits from a least significant bit to a J-th bit;

(b) code write means for sequentially generating detection codes capable of sequentially identifying each of the blocks of said external RAM, and for writing each of the detection codes to the specified address generated by said address control means, wherein a detection code corresponding to a non-existing block for said external RAM is written at the specified address of a first block of the RAM by generation of an image address to replace a previously written detection code identifying the first block;

(c) code readout means for reading out the detection code written in the first block of said external RAM every time said code write means writes a detection code to additional blocks of the RAM other than said first block;

(d) code comparison means for sequentially comparing the detection code read out by said code read out means and the detection codes written to the additional blocks of said external RAM by said code write means; and (e) memory capacity detection means including determining means for determining that a detection code read out by said code readout means has been written by generation of said image address to said first block instead of the non-existing block, when a comparison result produced by said code comparison means represents a coincidence, and detecting means for detecting that said external RAM has a memory capacity of a number of blocks corresponding to that detection code generated prior to the coincident detection code determined by said determining means.

7. Equipment according to claim 6, wherein said external RAM is in the form of a memory card.

8. Equipment according to claim 6, wherein said specified addresses correspond to initial addresses of each block of said external RAM.

9. Equipment according to claim 6, wherein said control means includes a counter for causing said address control means and said code write means to be sequentially operated after said counter is initialized, and when comparison results produced by said code comparison means represent non-coincidence.

10. Equipment according to claim 6, wherein said RAM capacity detection means further comprises memory capacity storage means for writing a code representing a memory capacity of the external RAM as detected by said memory capacity detecting means.

* * * * *

UNITED STATES PATENT AND TRADEMARK OFFICE
CERTIFICATE OF CORRECTION

PATENT NO. : 5,003,506
DATED : March 26, 1991
INVENTOR(S) : Hiroshi ITAYA It is certified that error appears in the above-identified patent and that said Letters Patent is hereby corrected as shown below:

TITLE PAGE:

Section [56] References Cited, insert the following:

FOREIGN PATENT DOCUMENTS -

0 108 346   5/1984   European

OTHER DOCUMENTS -

IBM TECHNICAL DISCLOSURE BULLETIN, Vol. 15, No.12, May 1973, Page 3796, New York, U.S., K. Fritsch et al "Availability of Additional Storage Capacity".

Signed and Sealed this

Sixteenth Day of February, 1993

*Attest:*

STEPHEN G. KUNIN

*Attesting Officer*     *Acting Commissioner of Patents and Trademarks*